(12) United States Patent
Wright

(10) Patent No.: US 6,698,316 B1
(45) Date of Patent: Mar. 2, 2004

(54) ASYMMETRICAL FASTENING SYSTEM

(75) Inventor: Richard B. Wright, Akron, OH (US)

(73) Assignee: Wright Tool Company, Barberton, OH (US)

( * ) Notice: Subject to any disclaimer, the term of this patent is extended or adjusted under 35 U.S.C. 154(b) by 395 days.

(21) Appl. No.: 09/282,865

(22) Filed: Mar. 31, 1999

Related U.S. Application Data

(63) Continuation-in-part of application No. 09/059,712, filed on Apr. 13, 1998.

(51) Int. Cl.[7] .............................................. B25B 13/06
(52) U.S. Cl. ....................................... 81/121.1; 81/436
(58) Field of Search ................................ 81/121.1, 436, 81/441, 119, 124.2, 124.3, 460, 461; 411/402–405, 410

(56) References Cited

U.S. PATENT DOCUMENTS

| | | |
|---|---|---|
| 996,841 A | 7/1911 | Dixon |
| 1,798,944 A | 3/1931 | Jackman |
| 2,400,205 A | 5/1946 | Livermont |
| 2,685,812 A | 8/1954 | Dmitroff |
| 2,813,450 A | 11/1957 | Dzus |
| 3,354,757 A | 11/1967 | Grimm et al. |
| 3,425,314 A | 2/1969 | Ohlson |
| 3,656,396 A | 4/1972 | Gutshall |
| 3,802,303 A | 4/1974 | Evans et al. |
| 3,834,269 A | 9/1974 | Ohringer |
| 3,854,372 A | 12/1974 | Gutshall |
| 3,881,377 A | 5/1975 | Evans et al. |
| 3,885,480 A | 5/1975 | Muenchinger |
| 3,903,764 A | 9/1975 | Andersen |
| 3,908,488 A | 9/1975 | Andersen |
| 4,073,160 A | 2/1978 | Perret |
| 4,084,478 A | 4/1978 | Simmons |
| 4,151,621 A | 5/1979 | Simmons |
| 4,187,892 A | 2/1980 | Simmons |
| 4,352,614 A | 10/1982 | Hirsch |
| 4,361,412 A | 11/1982 | Stolarczyk |
| 4,742,735 A | 5/1988 | Stencel |

(List continued on next page.)

FOREIGN PATENT DOCUMENTS

| | | |
|---|---|---|
| DE | 306 294 | 6/1918 |
| DE | 40 22 763 A1 | 1/1991 |
| DE | 19610748 | 2/1997 |
| FR | 2 234 095 | 1/1975 |
| GB | 1204294 | 3/1970 |
| GB | 2060452 | 7/1981 |
| GB | 2140523 | 11/1984 |
| WO | WO8809708 | 12/1988 |
| WO | WO 99/18361 | 4/1999 |
| WO | WO 00/13857 | 3/2000 |

OTHER PUBLICATIONS

John Forbis, "Double–stage fracturable fastener for bondable elements" Navy Technical Disclosure Bulletin, vol. 10, No. 3, Mar. 1985 pp. 45–51.

"Screws have automatic torque control" Machine Design, vol. 54, No. 23, Oct. 1982, p. 112.

Phillips Screw Company, *Specification sheets*, 1992, 16 pp.

*Primary Examiner*—D. S. Meislin
(74) *Attorney, Agent, or Firm*—D. Peter Hochberg; Sean Mellino; Katherine R. Vieyra

(57) ABSTRACT

Disclosed is an asymmetrical fastening system comprising (1) a fastener having asymmetrical loosening surfaces and tightening surfaces formed in a single fastening periphery, and (2) a wrench comprising asymmetrical loosening surfaces and tightening surfaces formed in a single fastening periphery, that engage, respectively, the loosening surfaces and tightening surfaces of the fastener. When the wrench engages the fastener and force is applied to the wrench the torque to failure of the system in the loosening direction is greater than the torque to failure in the tightening direction.

21 Claims, 11 Drawing Sheets

U.S. PATENT DOCUMENTS

| | | |
|---|---|---|
| 4,882,957 A | 11/1989 | Wright et al. |
| 5,012,706 A | 5/1991 | Wright et al. |
| 5,174,704 A | 12/1992 | Kazino et al. |
| 5,449,260 A | 9/1995 | Whittle |
| 5,461,952 A | 10/1995 | Goss |
| 5,481,948 A | 1/1996 | Zerkovitz |
| D372,409 S | 8/1996 | Wright et al. |
| 5,542,273 A | 8/1996 | Bednarz |
| 5,551,322 A | 9/1996 | Mikic et al. |
| 5,921,735 A | 7/1999 | Hughes |
| 5,957,645 A | 9/1999 | Stacy |

ASYMMETRICAL FASTENING SYSTEM

This application is a continuation-in-part of Ser. No. 09/059,712 filed Apr. 13, 1998, pending.

BACKGROUND OF THE INVENTION

The invention relates generally to a wrench and fastener arrangement and more particularly to a wrench and fastener arrangement having a higher torque to failure in the loosening direction than in the tightening direction.

Fasteners come in a variety of types. For example, there are nuts, which are threaded onto a metal shaft and bolts which may threadingly receive a nut, or be threadingly received in a bore. Fasteners usually have a head that includes surfaces for loosening and surfaces for tightening. On many fasteners, the loosening surfaces are the same as the tightening surfaces (for example, a hex head nut or bolt). Other fasteners utilize surfaces for loosening that are different than the surfaces utilized for tightening. The loosening surfaces and tightening surfaces may be formed on the outer perimeter of the fastener head (hereinafter an "external fastener") or on a periphery formed inside of the outer perimeter (hereinafter, an "internal fastener"). External fasteners are designed to be used with open end wrenches or closed end wrenches, such as box wrenches or socket end wrenches. Internal fasteners (among which are so called "Allen" fasteners) are generally designed to be used with an internal-key wrench. Some wrenches (such as an open-end adjustable wrench) are designed to fit a variety of fastener sizes and configurations.

The periphery on which the loosening surfaces and tightening surfaces of a, fastener are formed is referred to herein as a fastening periphery. While many fasteners have the loosening surfaces and tightening surfaces formed on the same fastening periphery, it is also known to form loosening surfaces on one fastening periphery and tightening surfaces on a different fastening periphery. Such a design has the disadvantages of (1) being relatively expensive, and (2) having too large a fastener head to practically be used in certain applications.

Known wrenches and fasteners have primarily been designed symmetrically, transmitting torque equally in both the tightening and loosening directions. Typical socket wrench types of this kind are shown in FIGS. 1–3. FIG. 1 shows a 1½" Hex socket, FIG. 2 shows a 1" 12 point socket, and FIG. 3 shows a 1" 12 point spline. However, the torque required for loosening a fastener that has been tightened is several times more than the torque required for tightening a fastener. This is because metal surfaces in contact with one another for an extended period of time tend to seize and resist separation. Another factor that causes the fastener to resist separation is the dissolution of the lubricant that may have been present at the time of tightening. Additionally, tightening of a fastener to near its ultimate strength will cause permanent deformation. This permanent deformation causes the pitch of the threads on the fastener to no longer precisely match the pitch of the nut or the tapped hole. The mismatch requires additional torque to force the threaded elements to conform sufficiently to allow rotation of the fastener. The application of the additional torque required to loosen a fastener can result in system failure (sometimes referred to herein simply as "failure") prior to the fastener being loosened.

There are numerous modes of fastening system failure. When failure occurs, the mode of failure depends on both the design and physical properties of the wrench and fastener, including their respective strengths, hardnesses and ductilities. A socket wrench may split because of the combined circumferential and radial forces, or its teeth (referred to herein as protuberances) may shear or bend because of the combination of radial and circumferential forces. Or the teeth may flow from excessive contact pressure. Further, the points (referred to herein as protuberances) of the fastener may shear, bend or flow. In addition, in the case of a hollow-head fastener, the fastener head may split due to a combination of radial and circumferential forces, or the wrench may fail in torsion. Existing fasteners and wrenches tend to have a single mode of failure for each particular wrench and fastener. There are numerous modes of failure for both wrenches and fasteners that must be considered so that if steps are taken to a strengthen against one failure mode it does not result in increasing the likelihood of another failure mode.

Fastening system failure is expensive because of increased labor and the cost of providing new wrenches and/or fasteners. For example, if a bolt fails the damaged bolt must usually be drilled and removed with special tools. Fastening system failure can also be dangerous because a user applying a great deal of force to a fastener can be harmed when the system fails and his hand or arm strike a hard or sharp object. As it will be understood, fastener system failure most often occurs when attempting to loosen a fastener because of the greater torque required.

In summary, it would be an advantage to provide a fastening system capable of generating sufficient torque to loosen a fastener, have a fastener and wrench design that can withstand the force of generating such torque without failing, and produce the system in the same dimensions as existing fastening systems.

SUMMARY OF THE INVENTION

The present invention solves these and other problems by providing an asymmetrical fastening system comprising a fastener and a wrench. The fastener has a single fastening periphery and the wrench has a single fastening periphery designed to engage the fastener periphery. A plurality of loosening surfaces and a plurality of tightening surfaces are formed on the fastening periphery and on the wrench fastening periphery. The system is asymmetrical because it is capable of generating more torque to loosen the fastener, and solve the hereto-forementioned problems, than tightening a fastener.

As used herein, the term radial refers to a vector extending outward in a straight line from the center of a fastener. In the preferred embodiment, the fastener has loosening surfaces formed at an angle closer to radial than the angle of the tightening surfaces. Therefore, the radial forces, i.e., the forces directed along a radial vector, which tend to damage the wrench or fastener, are less when a given torque is applied in the loosening direction than when the same torque is applied in the tightening direction. The circumferential force is the same in both cases. The circumferential forces transmit torque from the wrench to the fastener and are, therefore, the ones that tighten or loosen the fastener. The radial forces add to the stresses imposed on both the wrench and the fastener and work in conjunction with the circumferential forces to increase the total forces. The result is that the torque to failure of the system in the loosening direction is greater than the torque to failure in the tightening direction.

The reduction of radial forces can not be carried too far without causing failure from increased contact pressures and reduced shear areas. Thus, balance in design is necessary. But greater loosening strength can be achieved by designing the system to generate greater loosening torque without failure of the system, which requires the mechanical advantages of the system to be in favor of loosening. Thus, the best design is asymmetrical.

In accordance with the preferred embodiment, there is provided an asymmetrical fastener that can engage the asymmetrical wrench so that the fastener can be axially rotated to a loosened or tightened state. The wrench can be a socket type, a box end type wrench or an internal-key wrench type. The wrench preferably includes a plurality of protuberances and a plurality of recesses formed about a central axis in a single fastening periphery. Each protuberance includes a wrench loosening surface for loosening a fastener and a wrench tightening surface for tightening a fastener. The wrenching loosening is preferably formed at a much smaller angle, with respect to a radial vector extending from the wrench's central axis, than the wrench tightening surface. The result is that the torque to failure of the system is greater in the loosening direction. Another advantage of the present invention is the overall system improvement while maintaining the same size fastener head. The load transmission increases proportionally to the number of protuberances or teeth. Therefore, the number of teeth can vary depending on the application or particular torque requirements. Additionally, more teeth allows the use of a smaller head diameter for a given fastener's size because the difference between the major and minor diameters is less.

Also disclosed herein is a wrench protuberance having a greater area where shear forces act to reduce the likelihood that the protuberance will break or bend while in use.

BRIEF DESCRIPTION OF THE DRAWINGS

The invention may take physical form in certain parts and arrangement of parts, preferred embodiment of which will be described in detail in the specification and illustrated in the accompanying drawings which form a part hereof, and wherein.

DESCRIPTION OF A PREFERRED EMBODIMENT

The present invention is directed to a fastening system that (1) generates adequate torque to loosen a previously tightened fastener, (2) includes a fastener head and wrench configured so that they are more likely to withstand, without failure, the force required to generate the adequate torque to loosen a previously tightened fastener, and/or (3) can be manufactured to have the same dimensions as known fasteners in order to be used in existing applications. To generate the adequate torque to loosen a fastener, the present system is asymmetrical, meaning that the torque to failure of the system in the loosening direction is greater than the torque to failure in the tightening direction. By utilizing such an asymmetrical system, greater torque can be supplied to loosen a fastener than can be supplied by known systems. In the preferred embodiment, the greater torque to failure is primarily achieved in two ways. First, the angle of the loosening surfaces are close to radial, thereby directing most of the loosening force applied by the wrench along a circumferential vector, which generates a high loosening torque. Second, the tightening surfaces are formed at a greater angle to radial than the loosening surfaces. This is not as strong, but because less torque is required to tighten the fastener, there is still adequate tightening torque. Further, the greater angle for the tightening surface creates a larger recess between each fastener loosening surface and fastener tightening surface. This means that the size (i.e., the thickness) of the wrench protuberance engaging the recess is greater. A thicker wrench protuberance means the protuberance is less likely to fail, by either shearing or bending when the wrench is subjected to high forces and torque, particularly in the loosening direction.

The preferred embodiment of the invention, discussed in detail below, achieves the benefits disclosed herein by providing a fastening system comprising an asymmetrical fastener and an asymmetrical wrench specifically designed to engage the fastener. The invention is not, however, limited to the designs disclosed herein. For example, it is believed that similar results could possibly be achieved by providing fastener loosening surfaces and fastener tightening surfaces having different heights (relative the center of the fastener) or different angles relative the radii to create a different moment in the loosening direction than in the tightening direction when engaged by a wrench. Further, different moment arms for loosening and tightening could potentially be created by other fastener and/or wrench structures that enable the loosening surface of the wrench to contact the loosening surface of the fastener at a position further from the center of the fastener than where the tightening surface of the wrench contacts the tightening surface of the fastener.

Figure 12:
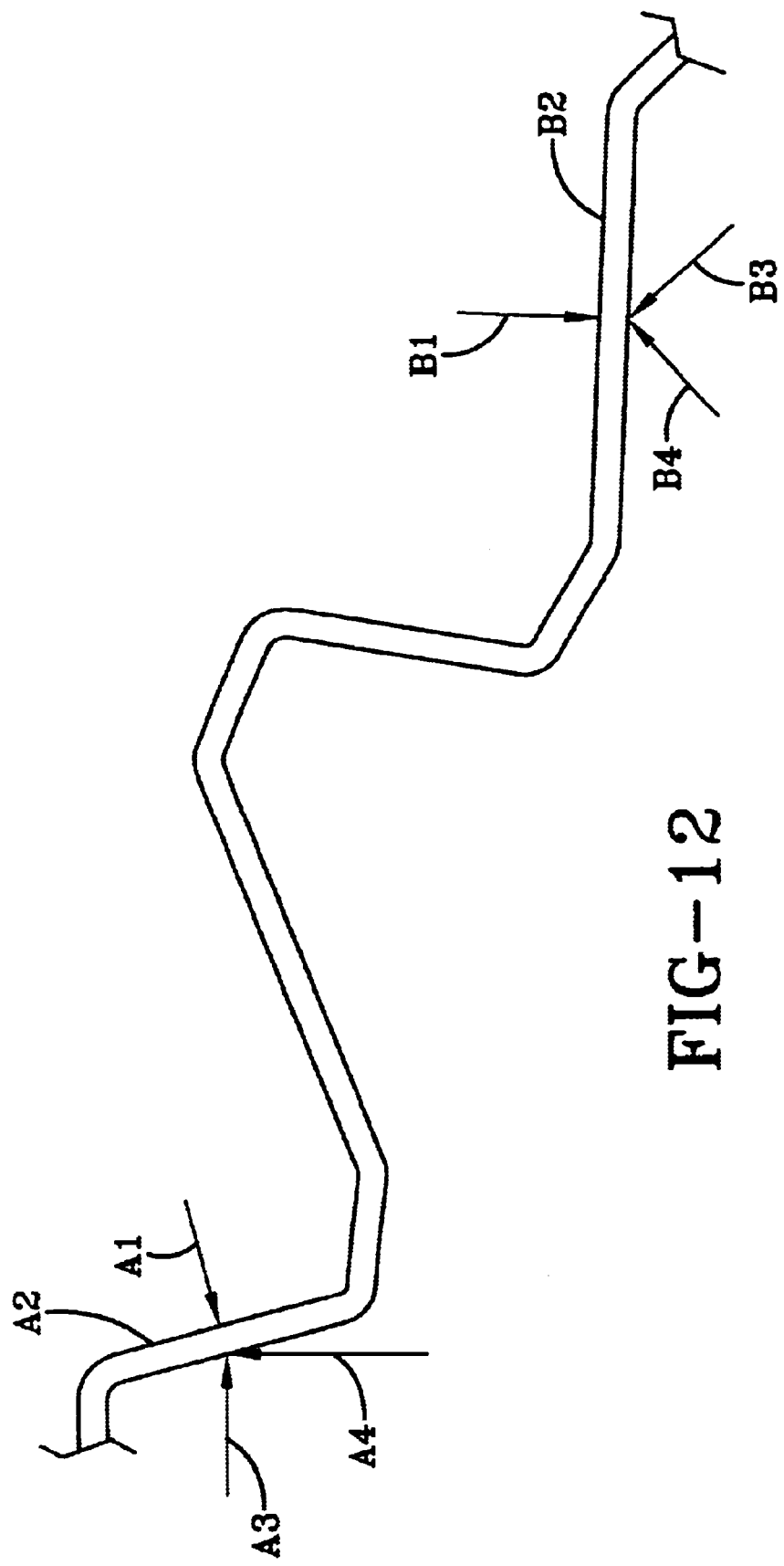
FIG. 12 is an enlarged, partial view of a fastener according to the invention showing the application of force to a fastener loosening surface and to a fastener tightening surface.

Prior to discussing the preferred embodiment in detail, FIG. 12 depicts the forces acting on the surfaces of a fastener made according to the invention. As used herein, radial forces are those directed along a radius (also called a radial vector) extending outward in a straight line from the center of the fastener and circumferential forces are those directed along a vector perpendicular to radial. It is the circumferential forces that generate torque to turn the fastener. The radial forces act only to deform the loosening surfaces or tightening surfaces or to split the outer member whether it be a wrench or fastener. Turning now to FIG. 12, force A1 is shown acting on a fastener loosening surface A2 formed at an angle close to radial. As the loosening surface of a wrench (not shown) transmits force A1 against fastener loosening surface A2, two force vectors, circumferential force A3 and radial force A4 are generated against the wrench loosening surface (not shown).

The forces shown at B are acting on a tightening surface B2 of the fastener. As the tightening surface of a wrench (not shown) transmits force B1 against fastener tightening surface B2, two force vectors, circumferential force B3 and radial force B4 are generated against the wrench tightening surface (not shown). Because of the differences in the angles of surface A2 and surface B2, when force A1 equals force B1, force A4 is less than force B4.

Figure 3:
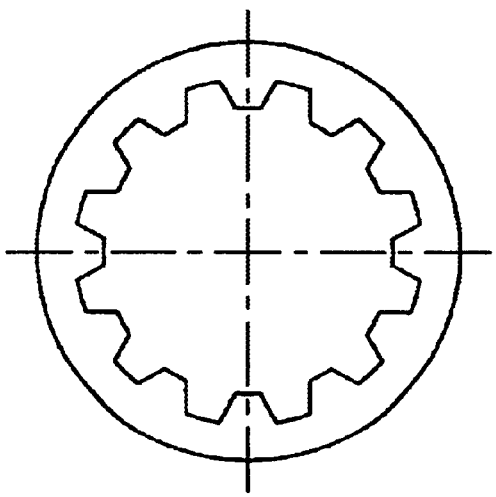
FIG. 3 is a front view of a 1" 12-point wrench socket spline according to the prior art.
Figure 2:
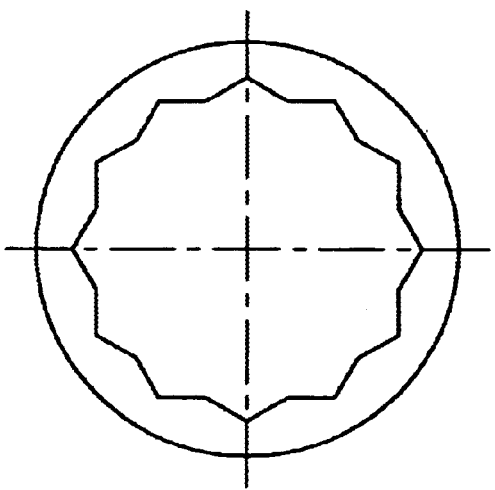
FIG. 2 is a front view of a 1" 12-point wrench socket according to the prior art.
Figure 1:
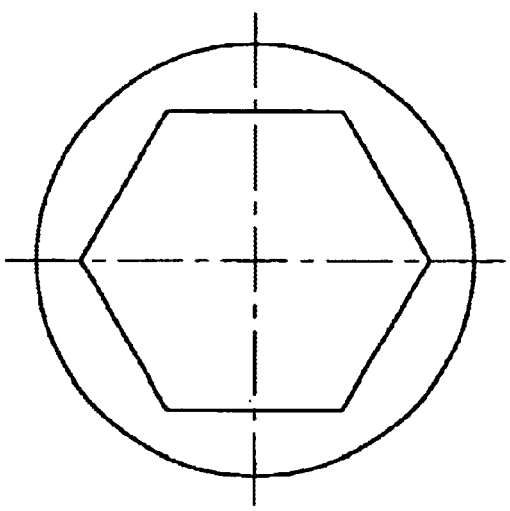
FIG. 1 is a front view of a 1" Hex wrench socket according to the prior art.
Figure 4:
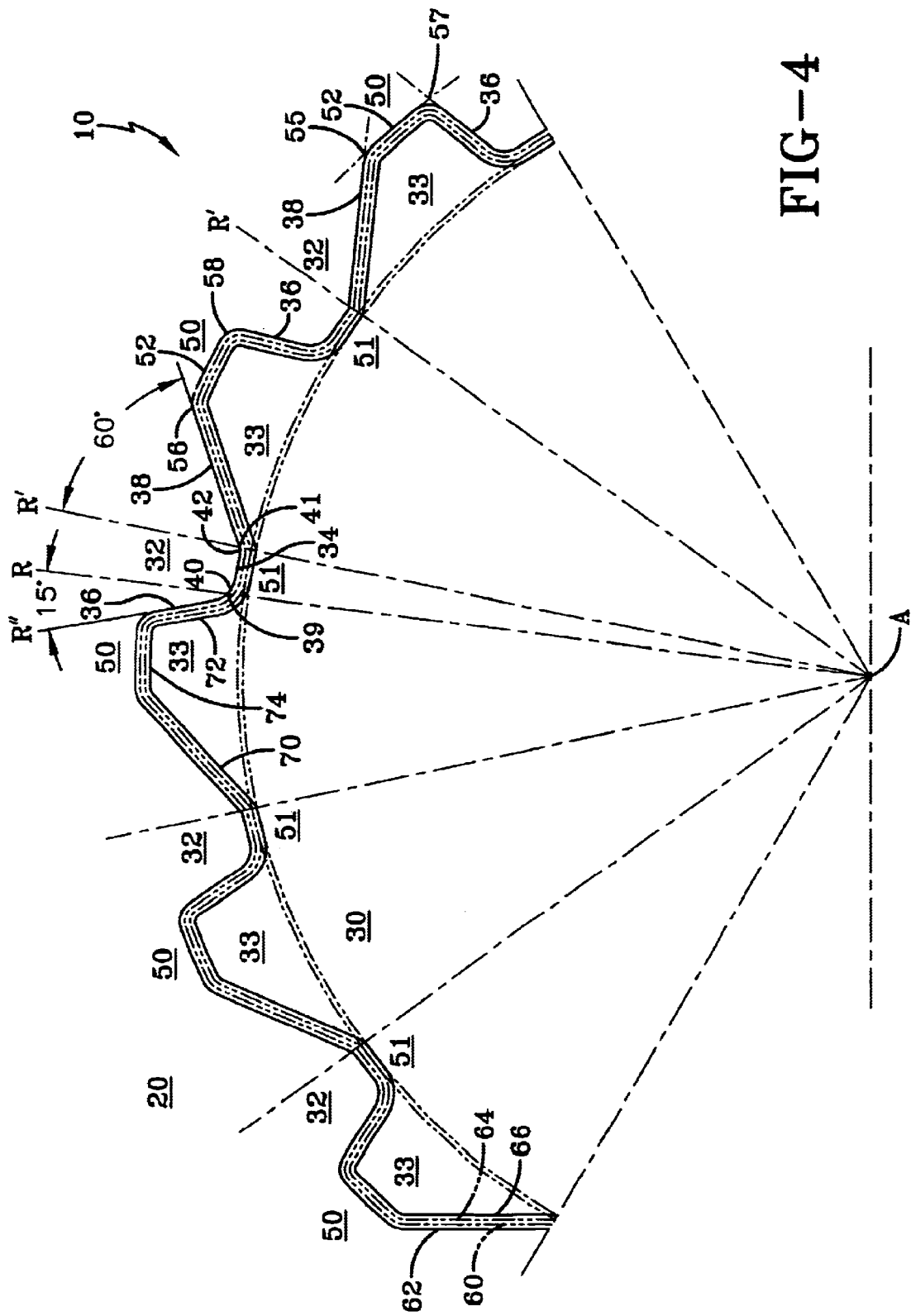
FIG. 4 is an enlarged view of a wrench and fastener represented in outline form.

Referring now to the drawings for the purpose of illustrating the preferred embodiment of the invention only, and not for the purpose of limiting same, FIG. 4 shows the invention in one of its preferred forms. An asymmetrical fastening system 10 is comprised of an asymmetrical wrench 20 presented in an outline form which could be an open or closed end wrench and a mating asymmetrical fastener 30. Standard wrenches and fasteners have a minimum and maximum cross flats dimension established by industry standards. These minimum and maximum dimensions require a maximum and minimum material, respectively. Wrench 20 has a maximum material 60 and a minimum required material 62. Fastener 30 has a maximum material 64 and a minimum material 66. The wrench and fastener must each be within the minimum and maximum tolerances to be categorized within a specified head size.

Wrench 20 is preferably a 15-point wrench comprised of fifteen uniformly peripherally, spaced protuberances 32 and fifteen uniformly peripherally spaced recesses 50 formed along a single wrench fastening periphery. No aspect of the invention is limited, however, to a wrench or fastener having any particular number of recesses, protuberances, fastening surfaces or loosening surfaces. Nor is the invention limited to a system wherein the number of loosening surfaces on the fastener are equal to the number of loosening surfaces on wrench, or the number of tightening surfaces on the fastener are equal to the number of tightening surfaces on the wrench. Furthermore, the wrench or the fastener, or both, may have fewer tightening surfaces than loosening surfaces or fewer loosening surfaces than tightening surfaces.

Referring again to FIG. 4, each protuberance 32 is preferably located equidistant from a central axis A and each recess 50 is located equidistant from the central axis A. Fastener 30 is preferably a 15-point fastener and comprises fifteen uniformly peripherally spaced protuberances 33 and a plurality of uniformly peripherally spaced recesses 51 formed along a single fastening periphery, having the same shape, respectively, as the protuberances and recesses of the wrench. Each protuberance of the fastener is located equidistant from the central axis A and each recess of the fastener is located equidistant from the central axis A. The protuberances of the wrench engage the recesses of the fastener and the protuberances of the fastener engage the recesses of the wrench. The protuberances are slightly smaller than the recesses to make engagement possible.

The protuberances are essentially identical for both the wrench and the fastener and only one of the protuberances of the wrench needs to be described in detail, since all of the wrench protuberances are preferably identical. It should be understood that the protuberances of the wrench extend inwardly, while the protuberances of the fastener extend outwardly, so that the surfaces described for the wrench will be diametrically opposed to the surfaces of the fastener. Protuberance 32 has an inner generally circumferential joining surface 34 that connects a wrench loosening surface 36 and a wrench tightening surface 38. Wrench loosening surface 36 and wrench tightening surface 38 interface with a fastener loosening surface 72 and a fastener tightening surface 70, respectively, on fastener 30. Fastener loosening surface 72 is connected to fastener tightening surface 70 by an outer fastener engagement surface 74. Inner joining surface 34 of wrench 20 extends equidistantly between a given radius from a first point 39 at wrench loosening surface 36 to a second point 41 at wrench tightening surface 38. Dashed line B-B extends circumferentially through approximately the center of the joining surfaces of the maximum and minimum material requirements. The ends of inner joining surface 34 converge with the wrench surfaces 36 and 38, and are joined together by a pair of arches 40 and 42. Wrench loosening surface 36 forms a 15° angle with respect to radius (also called a radial vector) R. Wrench tightening surface 38 forms a 60° angle with respect to radius R'. The result is that the circumferential force and torque for loosening is greater than the circumferential force and torque for tightening, given an equal force applied to the wrench for loosening and tightening. Furthermore, the radial force in the loosening direction is less than the radial force in the tightening direction, given an equal force applied to the wrench for loosening and tightening. Because of the differences in these forces, contributable in the preferred embodiment to the different angles, respectively, of the loosening surfaces and tightening surfaces, the torque to failure of the system (failure of either the fastener or the wrench, but preferably the wrench) is greater in the loosening direction than in the fastening direction. This is a benefit because, as previously mentioned, substantially more torque is required to loosen the fastener and the system still generates adequate torque to tighten the fastener properly. Because the present system can generate more torque in the loosening direction without failure, it is less likely to fail overall.

The recesses are essentially identical for both the wrench and the fastener and only one of the recesses of the wrench will be described in detail. It should be understood that the recesses 50 of the wrench extend outwardly, while the recesses 51 of the fastener extend inwardly so that the surfaces described for the wrench will be diametrically opposed, with respect to the fastener. Recess 50 has an outer circumferential joining surface 52 that connects wrench tightening surface 38, which is part of protuberance 32, with a second wrench loosening surface 36 of an adjoining protuberance. Outer circumferential joining surface 52 extends equidistantly along a given circumference from a first point 55 where it intersects the wrench tightening surface 38 to a second point 57, where it is joined at second wrench loosening surface 36. The ends of outer radial joining surface 52 converge with wrench surfaces 38 and 36, and are joined by a pair of arches 56 and 58. Wrench loosening surface 36 forms a 15° angle with respect to radius R". Wrench tightening surface 38 forms a 60° angle with respect to radius R' as previously discussed.

As can be seen in FIG. 4, protuberance 32 and adjoining recess 50 form a complete section for mating with a point on a fastener. These sections are preferably repeated radially and preferably equal the number of points of the mating fastener forming a saw tooth type shape. In this embodiment, there are 15 points but the invention could have 8, 10, 12 or a different number of points depending on the application, head size and torque requirements. It should also be understood, that the invention is not limited to a loosening surface having an angle 15° away from a radius extending from the central axis of the wrench or fastener, and is not limited to a tightening surface having an angle of 60° away from a radii extending from the central axis of the wrench or fastener. It should be understood that different angles could be chosen according to desired head size, number of points and torque requirements. In all cases the loosening surface would require a smaller angle than the tightening surface.

Figure 5:
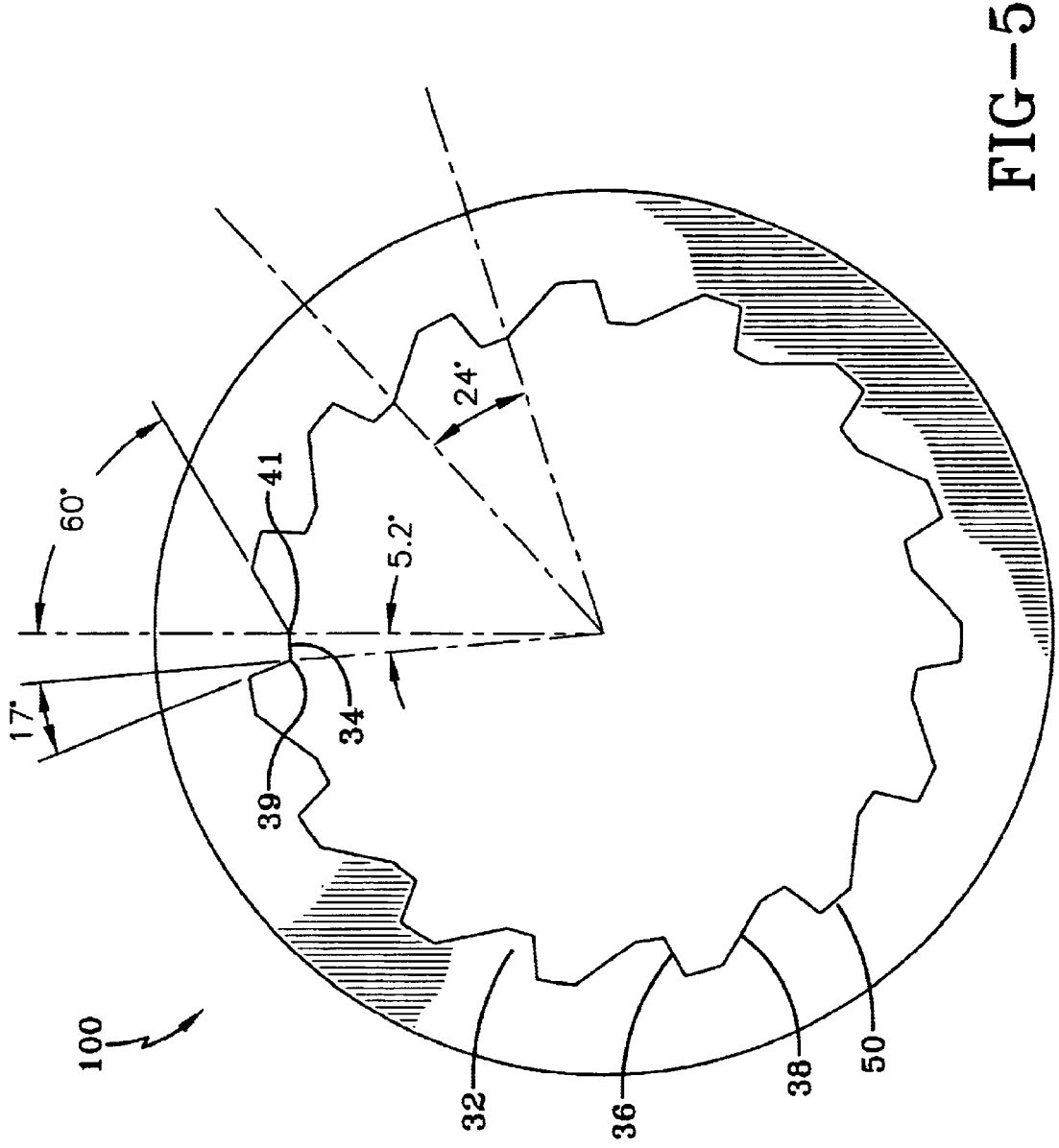
FIG. 5 is a cross-sectional handle-end view a 15-point wrench socket according to the invention.
Figure 6:
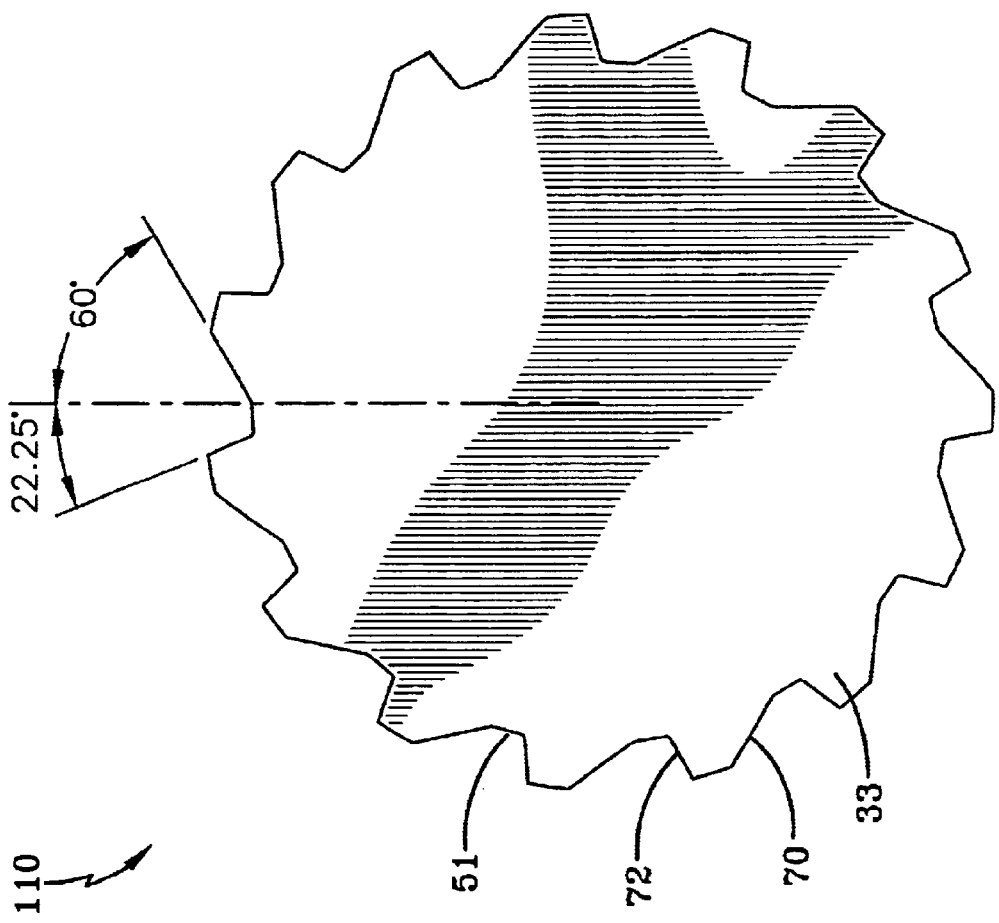
FIG. 6 is a top or socket-end view of a 15-point fastener mate for the wrench socket shown in FIG. 5.

For example, FIG. 5 shows a socket end wrench 100 (alternatively, a box wrench could be used) having 15 points and a mating fastener head 110 shown in FIG. 6. Referring now to socket end wrench 100, where like numerals denote like parts, socket head 100 comprises a plurality of protuberances 32 and recesses 50, as described previously, each having a wrench tightening surface 36 and a wrench loosening surface 38. The wrench tightening surfaces 36 have an angle of 60° away from radii extending from a central axis, like the previously described embodiment; however the wrench loosening surfaces 38 are at a 22.25° angle with radii extending from the central axis A. The steeper angle increases the torque transmission capability in the loosening direction of this embodiment, with respect to the previously described embodiment. Each protuberance 32 is spaced apart at 24° angles from each adjoining protuberance. In this particular embodiment, inner joining surface 34 extends circumferentially from points 39 to 41 over an angle of 5.2°.

Referring now to the fastener 110, where like numerals denote like parts, socket fastener 110 is comprised of a plurality of protuberances 33 and recesses 51, as described previously, having fastener tightening surfaces 70 and fastener loosening surfaces 72. The fastener tightening surfaces 70 have an angle of 60° away from radii extending from a central axis, and fastener loosening surfaces 72 are at a 22.25° angle with radii extending from the central axis, as described in mating wrench 100.

It should be appreciated that the number of points or teeth of the wrench and number of points on the fasteners can vary depending on the shape, size, hardness of the fastener, and the application being facilitated. Smaller heads can be used as the number of points increase because more teeth will allow for a smaller diameter head. However, smaller teeth require more precise manufacturing. Increasing the number of teeth can increase the amount of torque because there is a greater area over which to spread the forces, which reduces the probability of failure.

It should also be appreciated that the system described above is a preferred embodiment for increasing the torque to failure in the loosening direction. A standard design of a 12-point or higher fastener, depending on the details of its construction, including head height and material hardness, may not have sufficient wrenchability to fully utilize the properties of the fastener. However, using a larger cross flats dimension on a 12-point fastener would increase the torque transmission capability and improve the systems overall wrenchability, making it possible to fully utilize the properties of the fastener. For example, if the 12-point fastener is made with a cross flats of 1.3 or 1.5 times the bolt diameter, its wrenchability problems would be solved and designs originally made with hexagonal headed fasteners could be upgraded and standard wrenches used. The current invention provides a way around this problem while still preserving the smaller fastener heads.

It should also be appreciated that this fastening system could be applied to internal wrenching systems such as that found in hollow head cap screws such as "Allen" fasteners and internal-key wrenches. This could be possible by interchanging the wrench and the fastener so that the wrench element is inside the hollow head of the fastener. In this configuration, the number of points on the fastener and wrench are likely to be smaller to facilitate manufacturing, because the fastener loosening surfaces and fastener tightening surfaces are formed on a fastening periphery inside of the outer perimeter of the fastener, whereas previously the fastening perimeter was the outer perimeter of the fastener. This design is referred to as an internal wrenching configuration. A nut cannot be made with an internal wrenching configuration, it must have an external wrenching configuration, wherein the fastener loosening surfaces and fastener tightening surfaces are formed on the outer perimeter of the fastener, because space must be left for the tapped hole in the nut. In an internal wrenching configuration larger teeth can be used in the fastener periphery formed in the interior of the fastener because the fastener is not limited by the requirement for internal space in which to place a hole.

Figure 7:
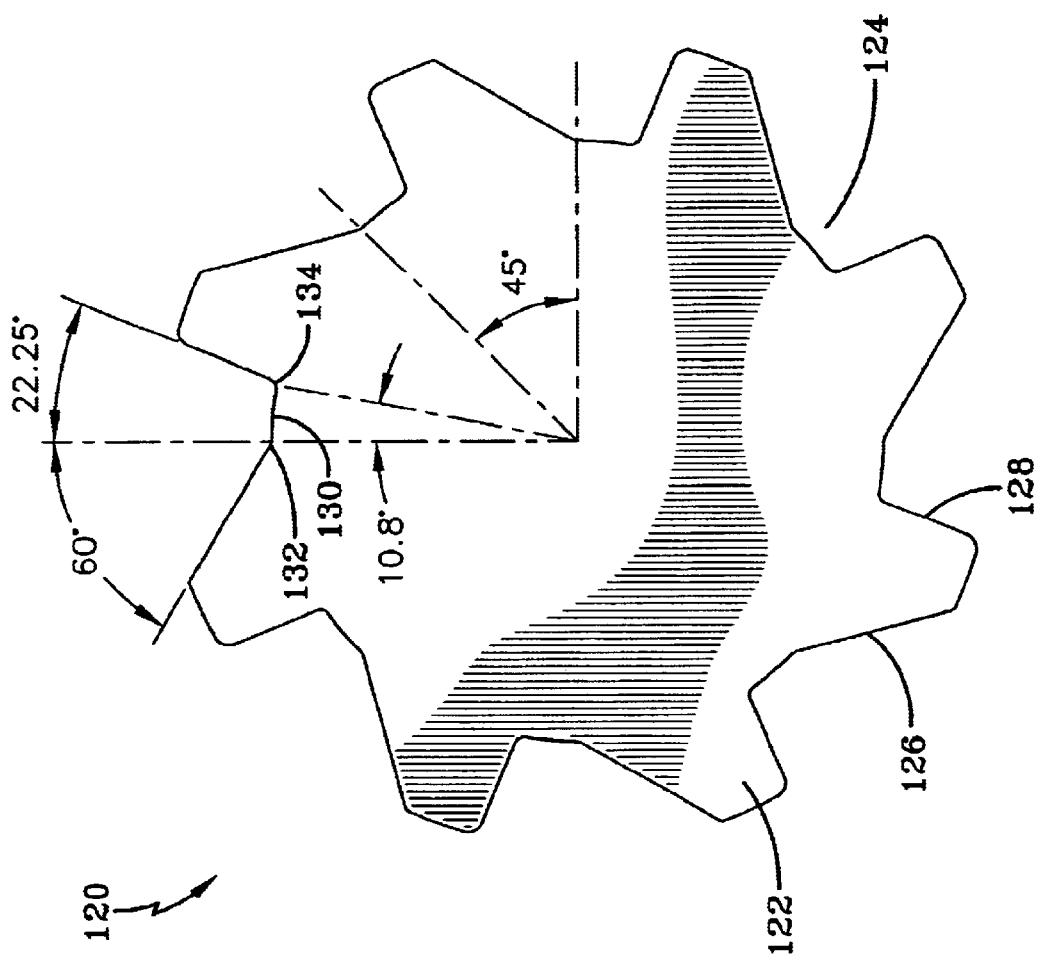
FIG. 7 is a cross-sectional handle-end view of an 8-point internal wrench in accordance with the invention.
Figure 8:
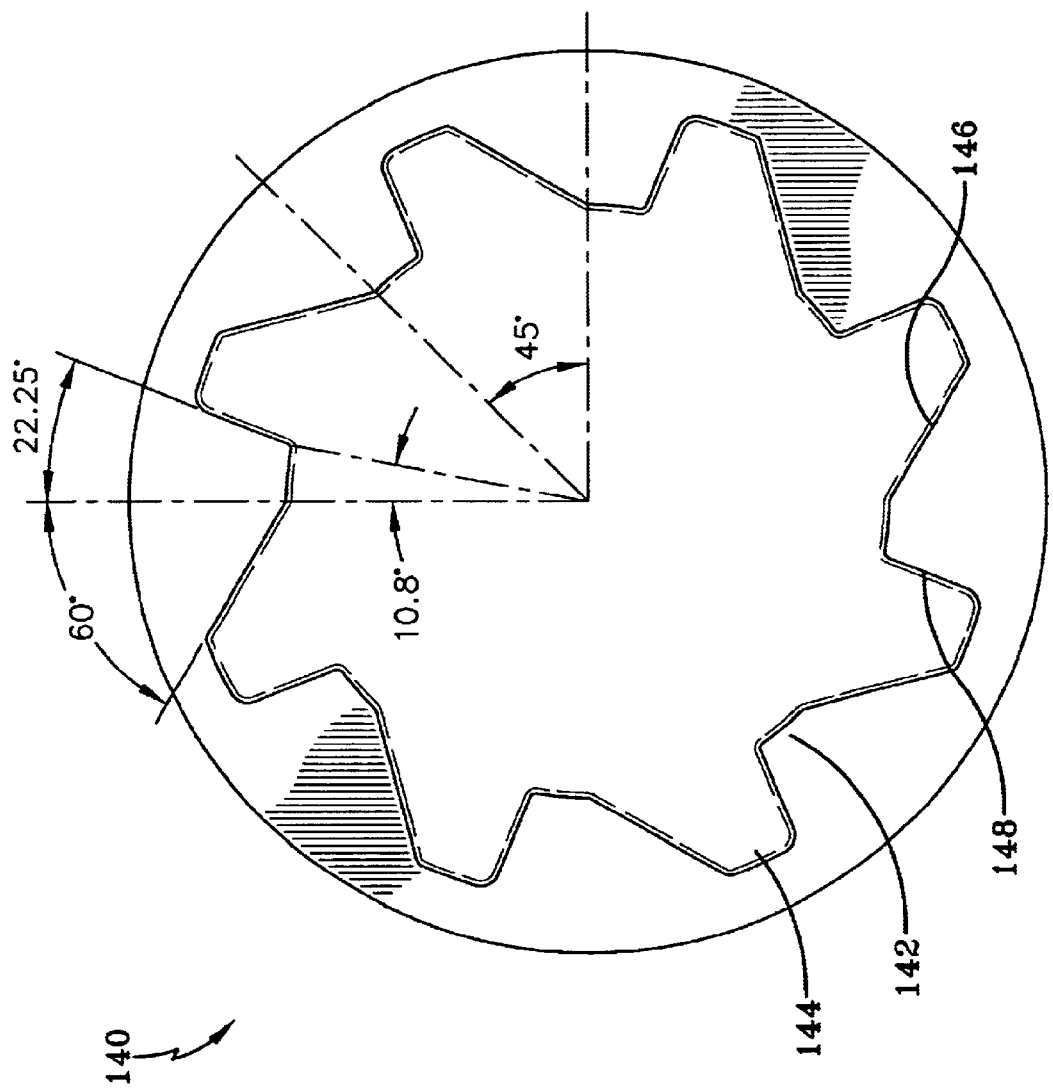
FIG. 8 is a top or handle-end view of an 8-point internal fastener mate for the internal wrench shown in FIG. 7.

Referring to FIG. 7, this figure shows an internal wrench 120 used for mating a hollow head cap screw 140 shown in FIG. 8. Internal wrench 120 and mating hollow head cap screw 140 each have 8 fastening points. Internal wrench 120 is comprised of a plurality of outwardly directed protuberances 122 and inwardly directed recesses 124, each having a wrench tightening surface 126 and a wrench loosening surface 128. Wrench tightening surfaces 126 have an angle of 60° away from radii extending from a central axis, and the wrench loosening surfaces 128 are at a 22.25° angle with radii extending from the central axis, like the previously described embodiment. Each protuberance 122 is spaced apart at a 45° angle from each adjoining protuberance. In this particular embodiment, inner joining surface 130 extends circumferentially from points 132 to 134 over an angle of 10.8°.

Referring now to mating hollow head cap 140, shown in FIG. 8, it is comprised of a plurality of inwardly directed protuberances 142 and outwardly directed recesses 144, as described previously, having fastener tightening surfaces 146 and fastener loosening surfaces 148. The fastener tightening surfaces 148 have an angle of 60° away from a radii extending from a central axis, and fastener loosening surfaces 146 are at a 22.25° angle with a radii extending from the central axis, as described in mating wrench 120. General tolerances with respect to the 60° and 22.25° angle would of course apply.

Figure 9:
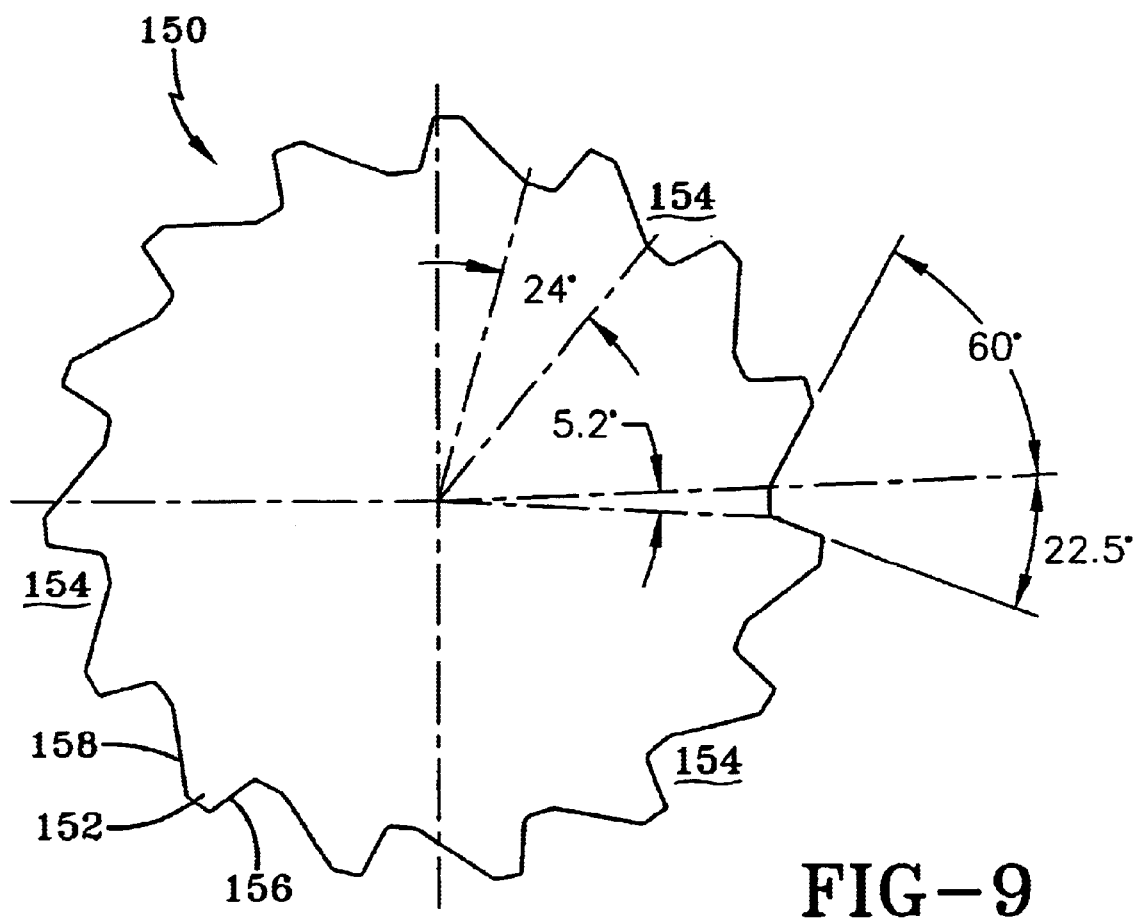
FIG. 9 is a top or socket-end view of a 15-point fastener for high torque tightening.
Figure 11:
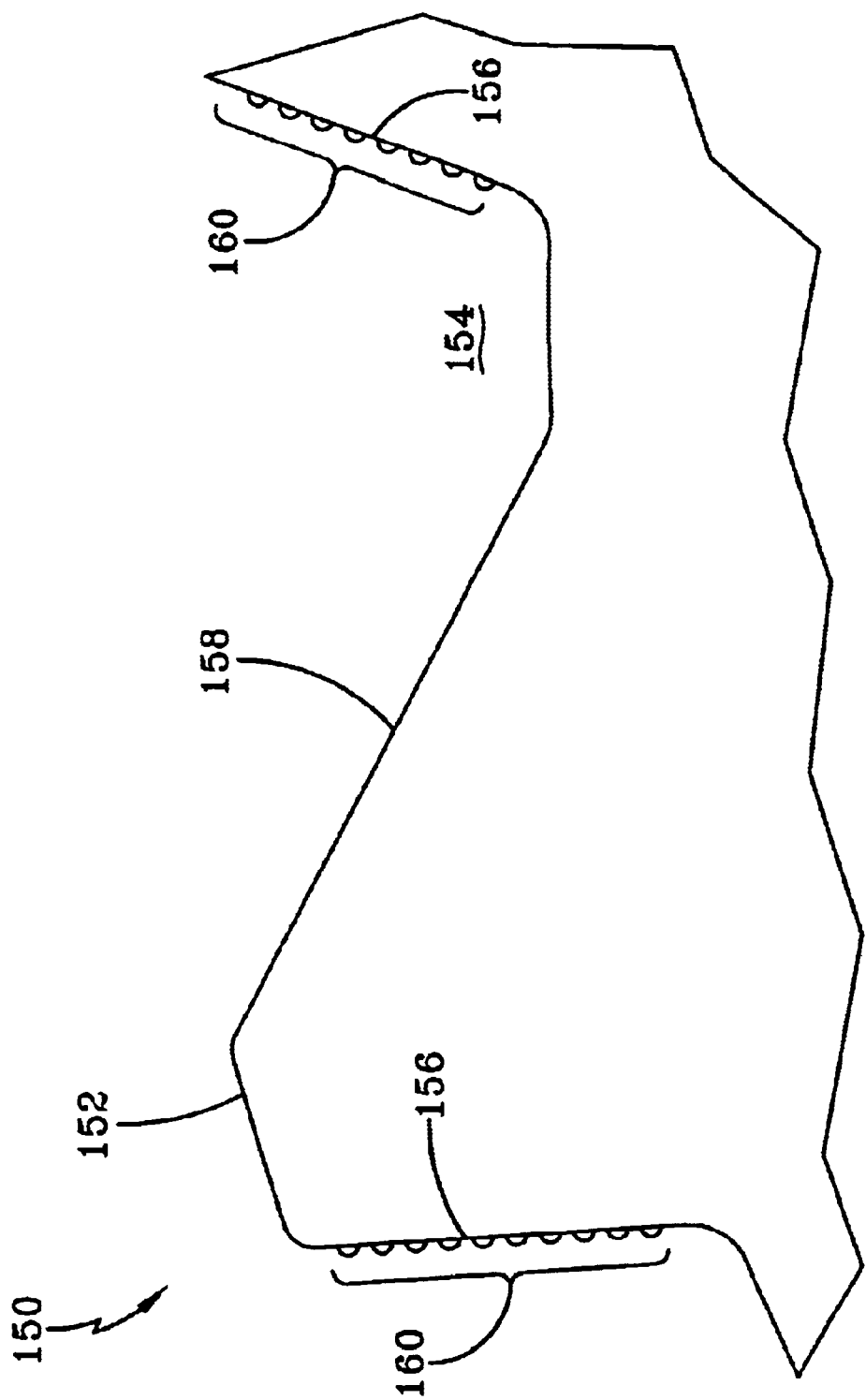
FIG. 11 is an enlarged top or socket-end view of FIG. 9 including ridges on the tightening surface.

Referring now to FIG. 9, a fastener 150 is comprised of a plurality of protuberances 152 and recesses 154, having a fastener tightening surfaces 156 and fastener loosening surfaces 158. The fastener tightening surfaces 156 each have an angle of 22.25° away from radii extending respectively from a central axis, and fastener loosening surfaces 158 are at a 60° angle with radii extending respectively from the central axis. Again, general tolerances would apply to the respective angles. For all practical purposes fastener 150 is a mirror image of fastener 110 shown in FIG. 6. For fasteners that will not be removed, loosening wrenching surfaces 158 are only used for backside support for the torque transmitting surfaces. As can be seen in FIG. 11, a plurality of ridges or projections 160 may be formed on tightening surface 156 of fastener 150. Ridges 160 deform when sufficient load is applied during the tightening process. Determining whether sufficient load has been applied can be done by visual inspection for large fasteners, or by use of a gage (not shown) for small fasteners that would only fit on the fastener if the projections were properly deformed. Such ridges or protrusions could also be formed in the corresponding surfaces of fasteners disclosed earlier where a higher torque is necessary in the loosening direction than in the tightening direction.

Figure 10:
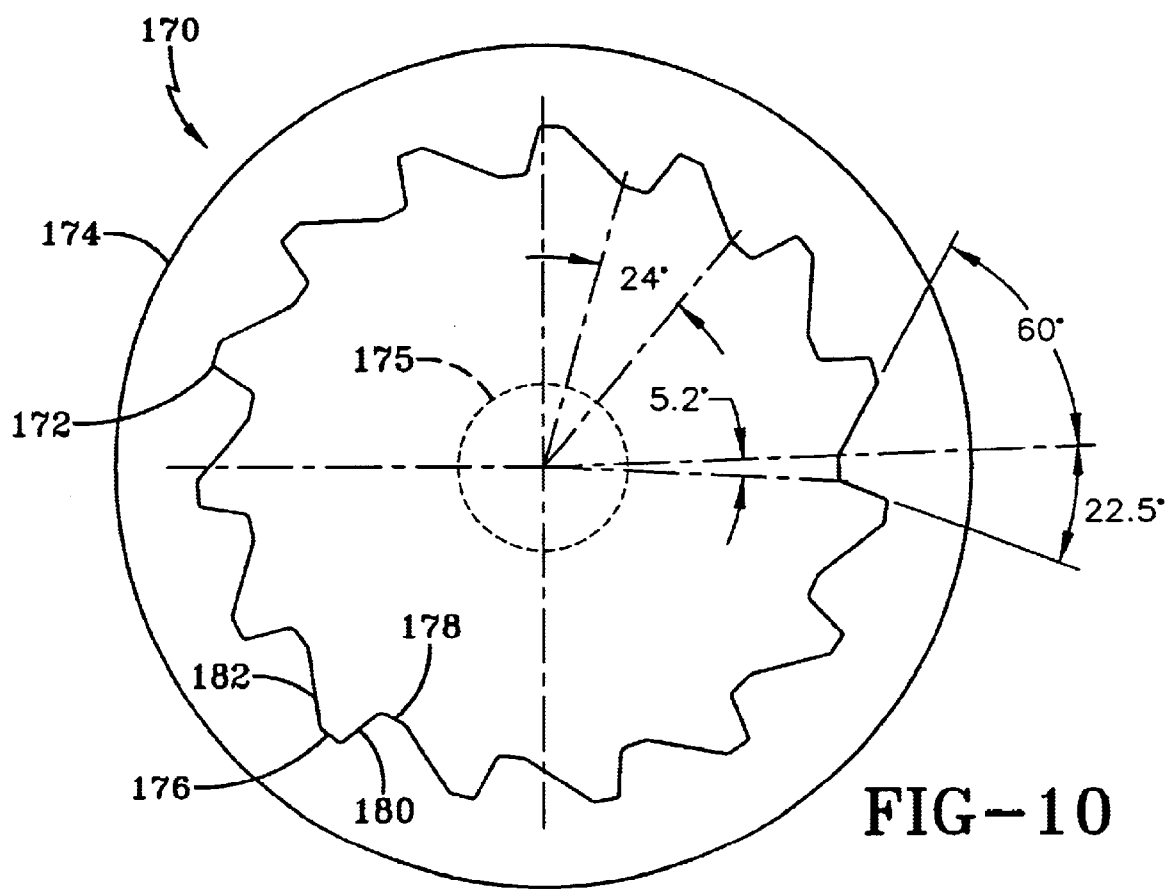
FIG. 10 is a top or socket-end view of a 15-point two headed fastener for high torque tightening.

The current invention is not limited to single headed fasteners. As shown in FIG. 10, a two headed fastener 170 is provided having an upper head 172 and a lower head 174 attached to one another by a neck 175 (shown by dashed lines). Upper head 172 is a high torque configuration head essentially identical to fastener 150 depicted in FIG. 9. Upper head 172 includes a plurality of protuberances 176 and a plurality of recesses 178, having fastener tightening surfaces 180 and fastener loosening surfaces 182. As before, fastener tightening surfaces 180 are at a much smaller angle than fastener loosening surfaces 182. Lower head 174 has a round circumference such that it can engage the surface it is tightened on, but cannot be removed. It should be appreciated that if it is desired to remove fastener 170, a head can be used similar to the head of fastener 110 of FIG. 6. The lower head could also be shaped in a configuration specifically adapted to a special removal tool. In using fastener 170, a matching wrench is placed over fastener head 172 and turned in the tightening direction. Once lower head 174 engages with the surface that fastener 170 is being fastened to and sufficient torque is applied, upper head 172 and neck 175 are severed from lower head 174. The security of fastener 170 can be further enhanced by enclosing lower head 174. The security of fastener 170 can be further enhanced by enclosing lower head 174 in a countersunk hole.

In addition, for any of the fastening systems used in the practice of the invention, the respective angles of the loosening surfaces and tightening surfaces of the fastener may be different than the respective angles of the loosening surfaces and tightening surfaces of the wrench. Preferably, the angles of the loosening surfaces of the fastener should be designed to be equal to, or vary up to 3° from, the angle of the loosening surfaces of the wrench. The angle of the tightening surfaces of the fastener are preferably equal to the angle of the tightening surfaces of the wrench.

Figure 13:
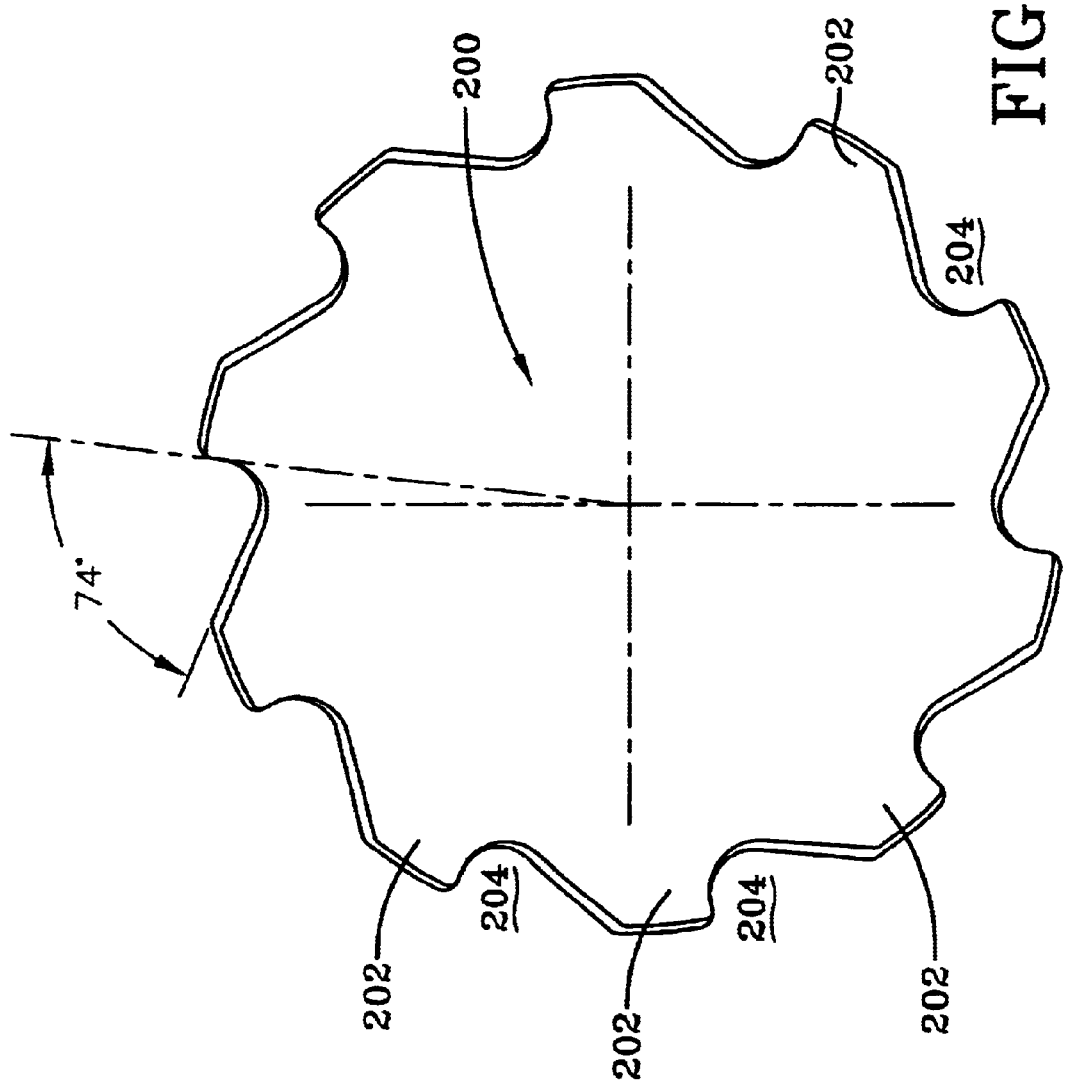
FIG. 13 is a front view of a ten-point wrench in accordance with the invention.

FIG. 13 shows a ten point internal-key wrench 200 according to the invention. Wrench 200 has ten protuberances 202, which are preferably of the same or similar configuration as previously described protuberances 32. Wrench 200 also has ten recesses 204, which are preferably of the same or similar configuration as previously described recesses 50. Wrench 200 is designed to engage, preferably, a ten point fastener (not shown) having ten protuberances and ten recesses having the same configurations as the previously described protuberances 32 and recesses 50. This embodiment (or theoretically any of the disclosed embodiments) could utilize a loosening surface having a 0° angle with respect to radial to generate less radial force.

The foregoing descriptions are specific embodiments of the present invention. These embodiments are described for the purposes of illustration only, and that alterations and modifications may be practiced by those skilled in the art without departing from the spirit and scope of the invention. It is intended that all such modifications and alterations be included insofar as they come within the scope of the invention as claimed or the equivalents thereof.

What is claimed is:

1. A fastening system comprising:
  a fastener having a single fastening periphery, said single fastening periphery comprising a plurality of alternating fastener protuberances and fastener recesses, wherein each of the fastener protuberances includes a fastener tightening surface and a fastener loosening surface; and
  a wrench having a single wrench fastening periphery, said single wrench fastening periphery comprising a plurality of alternating wrench protuberances and wrench recesses, wherein each of said wrench protuberances includes a wrench tightening surface and a wrench loosening surface, wherein the respective fastener tightening surfaces and wrench tightening surfaces and the respective fastener loosening surfaces and wrench loosening surfaces are oriented such that, when said wrench and said fastener are engaged and rotated, the fastener loosening surfaces align with the wrench loosening surfaces, and the fastener tightening surfaces align with the wrench tightening surfaces, and a torque to failure of the fastening system is greater in a loosening direction than in a tightening direction.

2. The fastening system according to claim 1, further comprising at least one deformable protrusion disposed on at least one of said fastener loosening surface or said fastener tightening surface of at least one of said plurality of fastener protuberances, said at least one deformable protrusion for deforming when said wrench is engaged with said fastener and said wrench is rotated at a predetermined torque.

3. The fastening system of claim 1 wherein:
  (a) each fastener protuberance further includes a fastener joining surface between the fastener loosening surface and the fastener tightening surfaces; and
  (b) each wrench protuberance further includes a wrench joining surface between the wrench loosening surface the wrench tightening surface.

4. The fastening system of claim 3 wherein at least one fastener protuberance includes the respective fastener tightening surface formed at a greater angle with respect to a fastener radial vector that passes through the respective fastener joining surface, than an angle of the respective fastener loosening surface formed with respect to the fastener radial vector;
  and wherein at least one wrench protuberance includes:
    the respective wrench tightening surface formed at a greater angle, with respect to a wrench radial vector that passes through the respective wrench joining surface, than an angle of the respective wrench loosening surface formed with respect to the wrench radial vector.

5. The fastening system of claim 4 wherein the angle of each fastener tightening surface is 60° and the angle of each fastener loosening surface is 15°.

6. The fastening system of claim 4 wherein the angle of each wrench tightening surface is 60° and the angle of each wrench loosening surface is 15°.

7. The fastening system of claim 4 wherein the wrench is a socket end wrench.

8. The fastening system of claim 4 wherein the wrench is a box wrench.

9. The fastening system of claim 4 wherein the wrench is an internal-key wrench.

10. The fastening system of claim 4 wherein the fastener is a nut including a threaded hole formed therethrough.

11. The fastening system of claim 4 wherein the fastener is a hollow-head cap screw.

12. The fastening system of claim 4 wherein the fastener and the wrench each have twelve or more protuberances and twelve or more recesses.

13. The system of claim 4 wherein the angle of each fastener loosening surface is 22.27° and the angle of each fastener tightening surface is 60°.

14. The system of claim 4 wherein the number of fastener loosening surfaces is selected from the group consisting of 8, 12, 15, and 18.

15. The fastening system of claim 4 wherein the number of wrench protuberances equals the number of fastener recesses.

16. The fastening system of claim 1 wherein the fastener is a nut including a threaded hole formed therethrough.

17. The fastening system of claim 1 wherein the fastener is a hollow-head cap screw.

18. The fastening system of claim 1 wherein the wrench is an internal key wrench.

19. The fastening system of claim 1 wherein the fastener and the wrench each have twelve or more protuberances and twelve or more recesses.

20. The fastening system of claim 1 wherein the number of wrench protuberances equals the number of fastener recesses.

21. The system of claim 1 wherein the number of wrench loosening surfaces are selected from the group consisting of 8, 12, 15, and 18.

* * * * *